(12) United States Patent
Sakurai et al.

(10) Patent No.: US 7,580,179 B2
(45) Date of Patent: Aug. 25, 2009

(54) METHOD OF MANUFACTURING INFORMATION DISPLAY DEVICE

(75) Inventors: Ryo Sakurai, Kokubunji (JP); Takanori Shoji, Higashimurayama (JP); Hidetoshi Hiraoka, Nishitokyo (JP); Taichi Kobayashi, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 302 days.

(21) Appl. No.: 10/583,546

(22) PCT Filed: Dec. 8, 2004

(86) PCT No.: PCT/JP2004/018302

§ 371 (c)(1),
(2), (4) Date: Jun. 19, 2006

(87) PCT Pub. No.: WO2005/062112

PCT Pub. Date: Jul. 7, 2005

(65) Prior Publication Data

US 2007/0139361 A1  Jun. 21, 2007

(30) Foreign Application Priority Data

Dec. 19, 2003 (JP) ............................. 2003-422865
Apr. 20, 2004 (JP) ............................. 2004-124304

(51) Int. Cl.
*G02B 26/00* (2006.01)
*G09G 3/34* (2006.01)
(52) U.S. Cl. ...................................... 359/296; 345/107
(58) Field of Classification Search ................. 359/296; 345/107; 430/32; 204/600
See application file for complete search history.

(56) References Cited

U.S. PATENT DOCUMENTS 6,909,532 B2 * 6/2005 Chung et al. ................. 359/296

FOREIGN PATENT DOCUMENTS

| JP | 6-8936 U | 2/1994 |
| JP | 2002-40467 A | 2/2002 |
| JP | 2002-333639 A | 11/2002 |
| JP | 007008254 | 5/2003 |
| JP | 2003-36040 A | 7/2003 |
| JP | 2003-248249 A | 9/2003 |
| JP | 2003-273490 A | 9/2003 |
| JP | 2003273490 A | 9/2003 |
| WO | 03/091798 A1 | 11/2003 |

* cited by examiner

*Primary Examiner*—William C Choi
(74) *Attorney, Agent, or Firm*—Sughrue Mion, PLLC

(57) ABSTRACT

A method of manufacturing an information display device having an information display panel, in which display media are sealed between two substrates, at least one substrate being transparent, and, in which the display media, to which an electrostatic field is applied, are made to move so as to display information such as an image, is characterized in that the improvement comprises, in the case of electrically connecting an electrode arranged on one substrate and an electrode arranged on the other substrate at an outer portion of an information display portion of the information display panel, the steps of: arranging an adhesive including conductive spacer particles having a diameter smaller than a distance between the electrodes arranged on the substrates at a predetermined portion between the substrates; and pressing a portion of the substrate, to which the adhesive is arranged, under pressure; so that the electrode arranged on one substrate is electrically connected to the electrode arranged on the other substrate.

3 Claims, 15 Drawing Sheets

FIG. 3
(a)
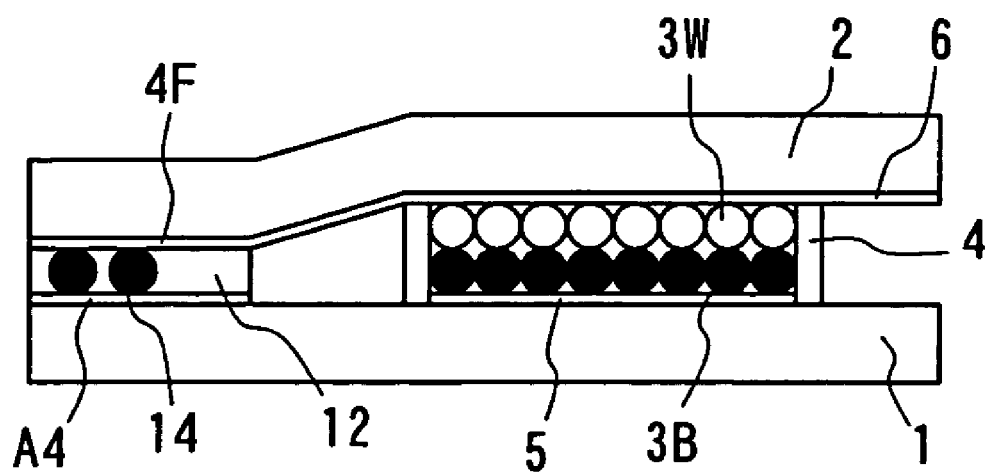
(b)
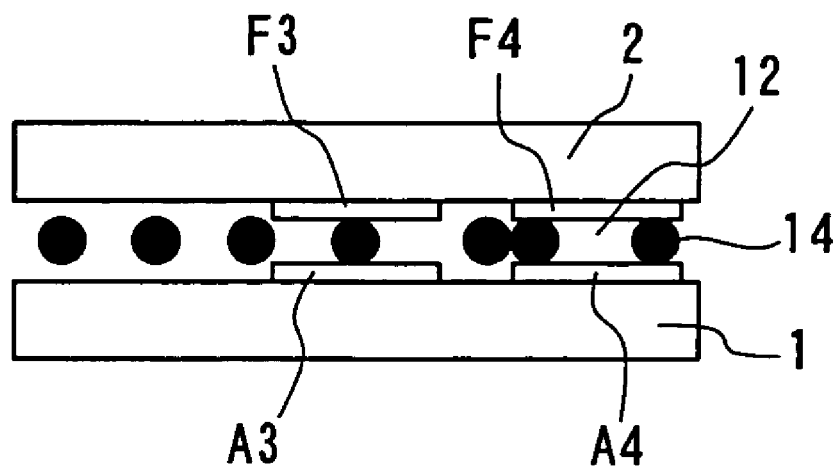

FIG. 4
(a)
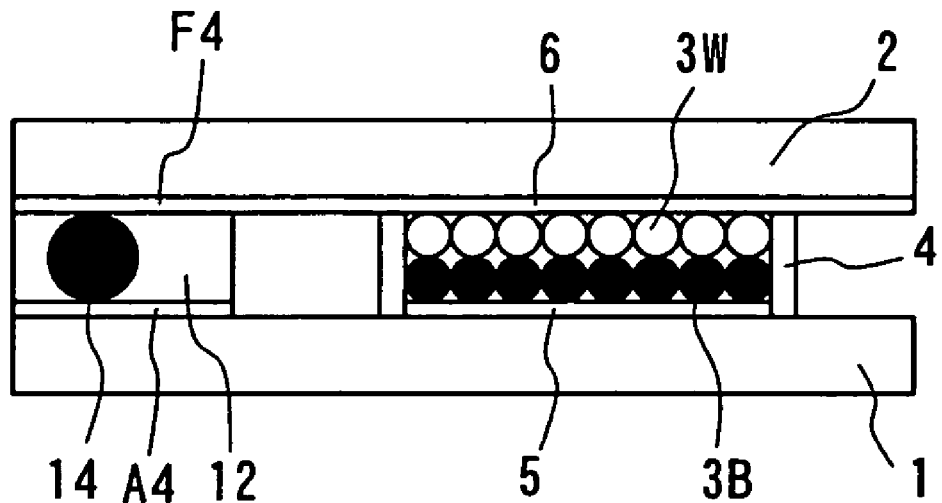
(b)
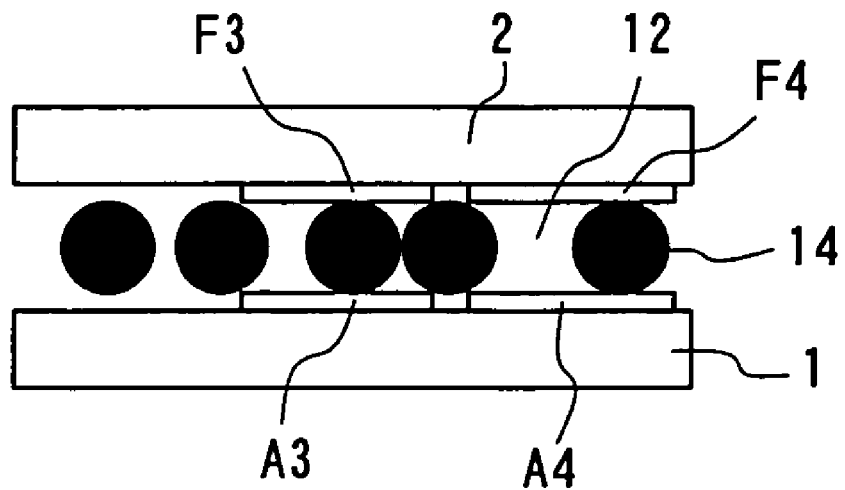

FIG. 6
(a)
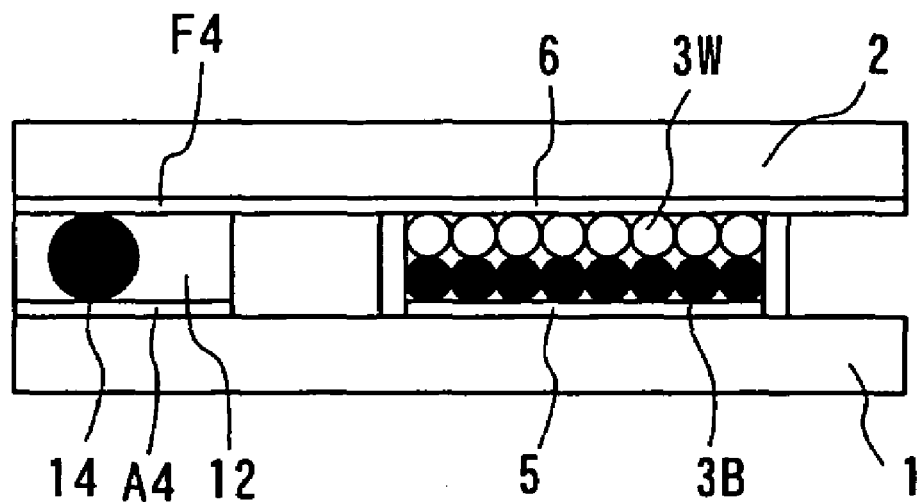
(b)
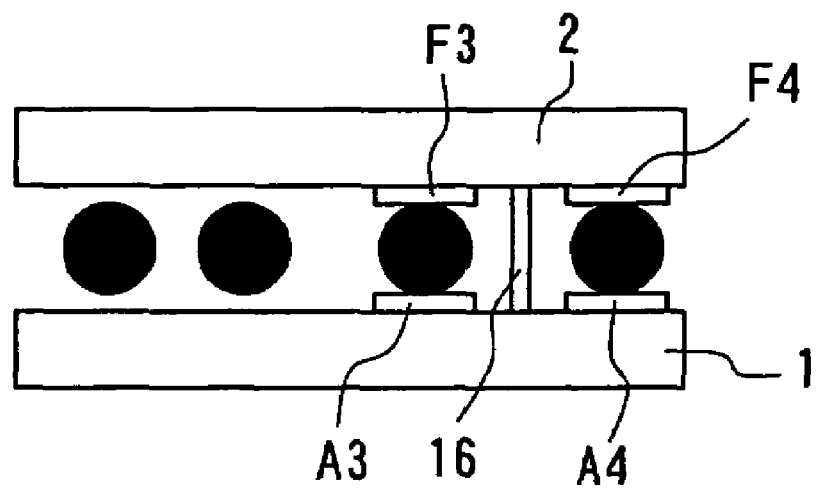

L/S=50/50 μm

L/S=100/100 μm

L/S=200/200 μm

L/S=50/50 μm

L/S=100/100 μm

L/S=200/200 μm

FIG. 9
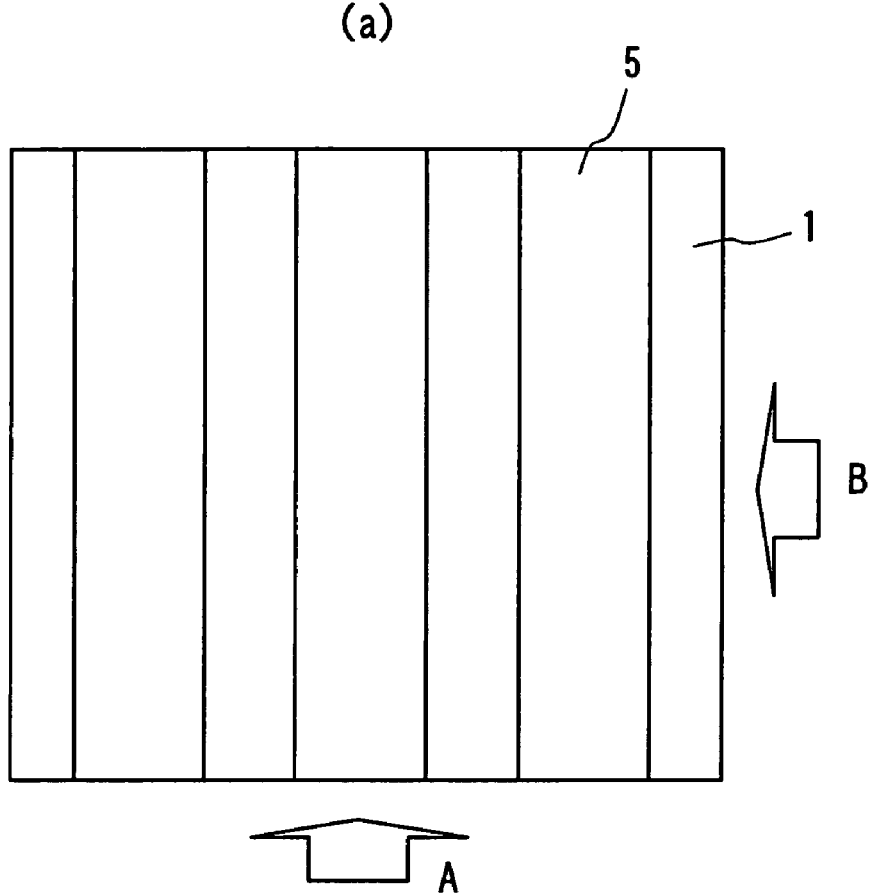
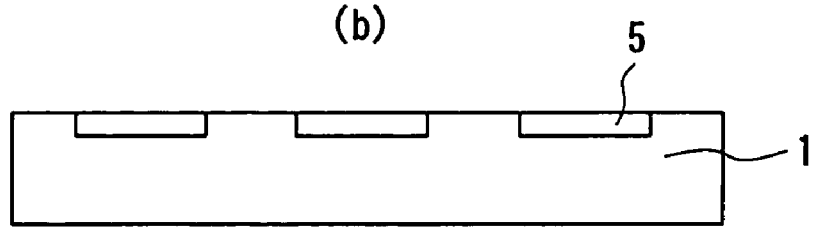
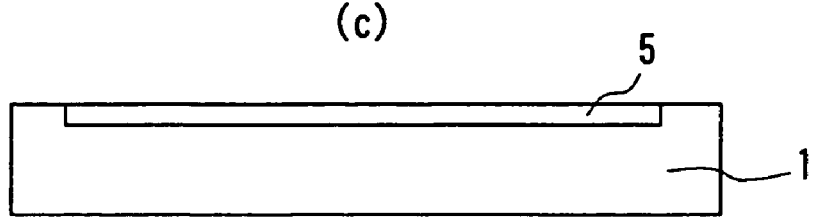

FIG. 10
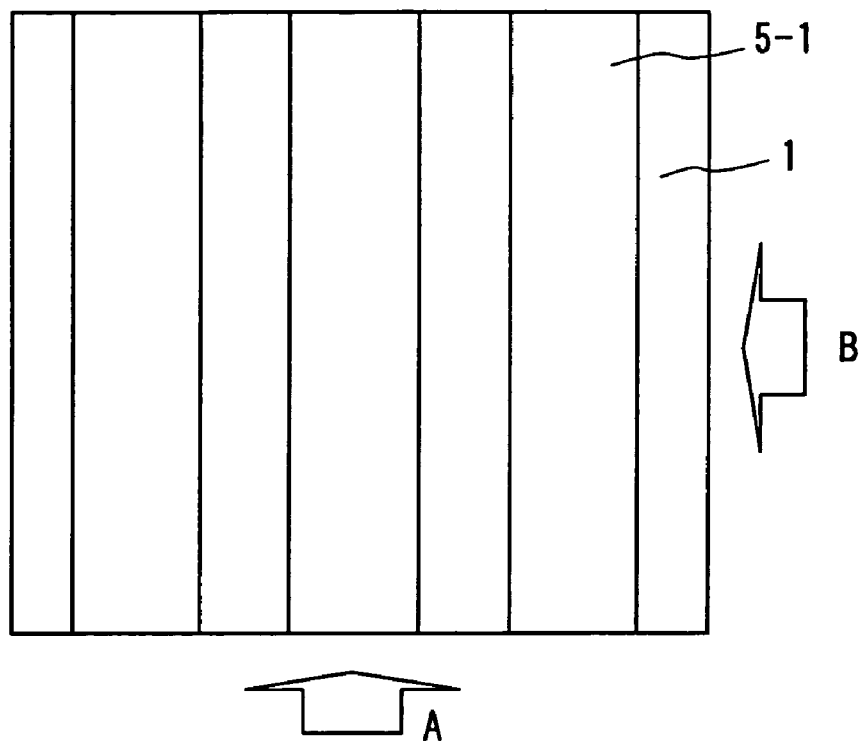
(a)
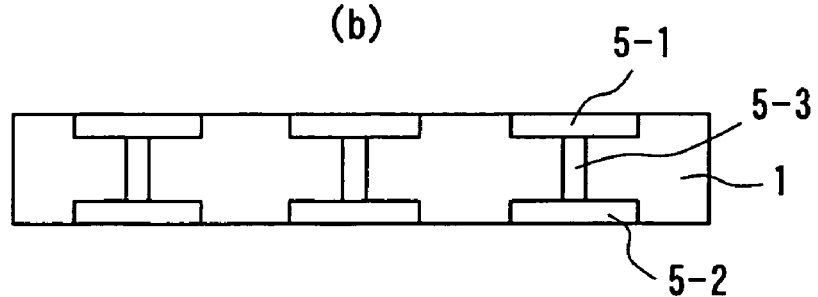
(b)
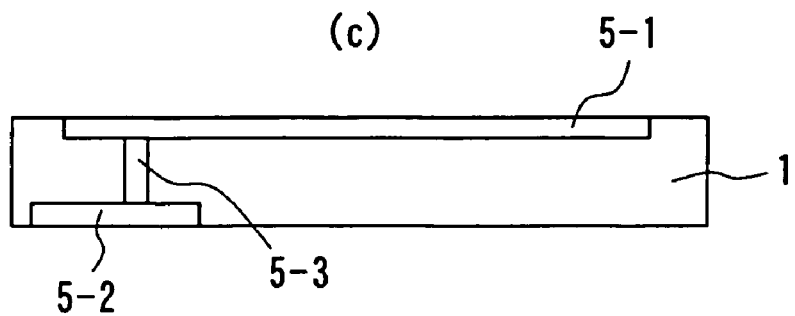
(c)

METHOD OF MANUFACTURING INFORMATION DISPLAY DEVICE

TECHNICAL FIELD

The present invention relates to a method of manufacturing an information display device having an information display panel, in which display media are sealed between two substrates, at least one substrate being transparent, and, in which the display media, to which an electrostatic field is applied, are made to move so as to display information such as an image.

BACKGROUND ART

As an information display device substitutable for liquid crystal display (LCD), information display devices with the use of technology such as an electrophoresis method, an electro-chromic method, a thermal method, dichroic-particles-rotary method are proposed.

As for these information display devices, it is conceivable as inexpensive visual display device of the next generation from a merit having wide field of vision close to normal printed matter, having smaller consumption with LCD, or having a memory function, and spreading out to a display for portable device and an electronic paper is expected. Recently, electrophoresis method is proposed that microencapsulate dispersion liquid made up with dispersion particles and coloration solution and dispose the liquid between faced substrates, and also it is expected.

However, in the electrophoresis method, there is a problem that a response rate is slow by the reason of viscosity resistance because the particles migrate among the electrophoresis solution. Further, there is a problem of lacking imaging repetition stability, because particles with high specific gravity of titanium oxide is scattered within solution of low specific gravity, it is easy to subside, difficult to maintain a stability of dispersion state. Even in the case of microencapsulating, cell size is diminished to a microcapsule level in order to make it hard to appear, however, an essential problem was not overcome at all.

Besides the electrophoresis method using behavior in the solution, recently, a method wherein electro-conductive particles and a charge transport layer are installed in a part of the substrate without using solution is proposed. [The Imaging Society of Japan "Japan Hardcopy '99" (Jul. 21-23, 1999) Transaction Pages 249-252] However, the structure becomes complicated because the charge transport layer and further a charge generation layer are to be arranged. In addition, it is difficult to constantly dissipate charges from the electro-conductive particles, and thus there is a drawback on the lack of stability.

As one method for overcoming the various problems mentioned above, an information display device comprising an information display panel is known, which has one or more cells formed in an isolated manner from one another by partition walls and accommodating display media and a plurality of image display elements, in which the display media are sealed between opposed two substrates, at least one of the two substrates being transparent, and, in which the display media, to which an electrostatic field is applied, are made to move so as to display information such as an image.

At first, as shown in FIG. 14a, a rear substrate 51 is prepared, on which electrodes B1-B4 for supplying power to cells forming respective information display portions and electrodes A1-A4 for connecting the connection terminals of the outer circuit are arranged. In addition, as shown in FIG. 14b, a transparent front substrate 52 is prepared, on which transparent electrodes F1-F4 for supplying power to the cells forming respective information display portions are arranged. Then, as shown in FIG. 14c, an anisotropic conductive adhesive 53 is arranged on the rear substrate at an outer portion of the information display portion. The anisotropic conductive adhesive 53 has conductivity only at the portions indicated by a symbol ○ at which the electrodes A1-A4 and the electrodes F1-F4 of the front substrate 52 are intersected. Finally, as shown in FIG. 14d, the rear substrate 51 and the front substrate 52 are stacked with each other through the adhesive 53, so that the electrodes F1-F4 of the front substrate 52 are electrically derived from the electrodes A1-A4 of the rear substrate 51. It should be noted that a numeral 54 shows the image display portion.

In the information display device having the construction mentioned above, since only the anisotropic conductive adhesive 53 is used for connecting the rear substrate 51 and the front substrate 52. Therefore, a secure connection cannot be achieved both in electric manner and in mechanical manner, and thus there is a drawback such that reliability cannot be obtained. Moreover, the information display device having the construction mentioned above has a construction such that the electrodes A1-A4 and B1-B4 are arranged on one surface of the rear substrate 51. Therefore, the following steps are necessary. That is, as shown in FIG. 15a, the rear substrate 51 and the front substrate 52 are stacked. Then, as shown in FIG. 15b, all sides of the stacked substrate are cut out, and further the end portion of the front substrate 52 is cut out while corresponding portion of the rear substrate 51 is remained, so that the portion of the electrodes A1-A4 and B1-B4 indicated by a symbol W are exposed. Then, as shown in FIG. 15c, the connection terminals of an outer circuit 55 are connected to the exposed portion of the electrodes A1-A4. As a result, there is a drawback such that a machining becomes difficult and a wide non-displaying surface exists.

DISCLOSURE OF INVENTION

An object of the present invention is to eliminate the drawbacks mentioned above and to provide a method of manufacturing an information display device, which can perform an electrode secure connection and can achieve an excellent reliability.

Moreover, another object of the present invention is to eliminate the drawbacks mentioned above and to provide a method of manufacturing an information display device, which can make a machining operation easy and can reduce a non-displaying surface.

According to a first aspect of the present invention, a method of manufacturing an information display device having an information display panel, in which display media are sealed between two substrates, at least one substrate being transparent, and, in which the display media, to which an electrostatic field is applied, are made to move so as to display information such as an image, is characterized in that the improvement comprises, in the case of electrically connecting an electrode arranged on one substrate and an electrode arranged on the other substrate at an outer portion of an information display portion of the information display panel, the steps of: arranging an adhesive including conductive spacer particles having a diameter smaller than a distance between the electrodes arranged on the substrates at a predetermined portion between the substrates; and pressing a portion of the substrate, to which the adhesive is arranged, under pressure; so that the electrode arranged on one substrate is electrically connected to the electrode arranged on the other substrate.

Moreover, as a preferred embodiment of the method of manufacturing the information display device according to the first aspect of the invention, a diameter of the conductive spacer particles included in the adhesive is 5-50 μm.

According to a second aspect of the present invention, a method of manufacturing an information display device having an information display panel, in which display media are sealed between two substrates, at least one substrate being transparent, and, in which the display media, to which an electrostatic field is applied, are made to move so as to display information such as an image, is characterized in that the improvement comprises, in the case of electrically connecting an electrode arranged on one substrate and an electrode arranged on the other substrate at an outer portion of an information display portion of the information display panel, the steps of: arranging an adhesive including conductive spacer particles at a predetermined portion between the substrates; and arranging a spacer between adjacent electrodes, to which the adhesive including the conductor spacer particles are arranged; so that the electrode arranged on one substrate is electrically connected to the substrate arranged on the other substrate.

Further, as a preferred embodiment of the method of manufacturing the information display device according to the second aspect of the invention, if the information display panel forms cells between the substrates, which are isolated with each other by partition walls, the spacer is formed simultaneously when the cells are formed.

According to a third aspect of the present invention, a method of manufacturing an information display device having an information display panel, in which display media are sealed between two substrates, at least one substrate being transparent, and, in which the display media, to which an electrostatic field is applied, are made to move so as to display information such as an image, is characterized in that the improvement comprises the steps of: preparing a substrate, in which electrodes are provided on both front surface and rear surface of one substrate, and, in which the electrodes are electrically connected with each other via through holes; stacking the thus prepared one substrate and the other substrate; and connecting connection terminals of an outer circuit to the electrodes provided at the rear surface of one substrate.

In addition, as a preferred embodiment of the method of the information display device according to the invention, the display media are particles or liquid powders.

Furthermore, as a preferred embodiment of the method of the information display device according to the third aspect of the invention, one substrate, in which the electrodes are provided on the front surface and the rear surface thereof, is a rear substrate.

In the method of manufacturing the information display device according to the first aspect of the invention, since, in the case of electrically connecting an electrode arranged on one substrate and an electrode arranged on the other substrate at an outer portion of an information display portion of the information display panel, an adhesive including conductive spacer particles having a diameter smaller than a distance between the electrodes arranged on the substrates is arranged at a predetermined portion between the substrates, and a portion of the substrate, to which the adhesive is arranged, is pressed under pressure, it is possible to perform the electrode secure connection and to achieve an excellent reliability.

Moreover, in the method of manufacturing the information display device according to the second aspect of the invention, since, in the case of electrically connecting an electrode arranged on one substrate and an electrode arranged on the other substrate at an outer portion of an information display portion of the information display panel, the steps of: an adhesive including conductive spacer particles is arranged at a predetermined portion between the substrates, and a spacer is arranged between adjacent electrodes, to which the adhesive including the conductor spacer particles are arranged, it is possible to perform the electrode secure connection and to achieve an excellent reliability.

Further, in the method of manufacturing the information display device according to the third aspect of the invention, since a substrate, in which electrodes are provided on both front surface and rear surface of one substrate, and, in which the electrodes are electrically connected with each other via through holes, is prepared, the thus prepared one substrate and the other substrate are stacked, and connection terminals of an outer circuit are connected to the electrodes provided at the rear surface of one substrate, it is possible to perform an easy machining and to reduce the non-displaying surface.

BRIEF DESCRIPTION OF DRAWINGS

FIGS. 3a and 3b are schematic views respectively explaining one embodiment of the information display panel according to the first aspect of the invention.

FIGS. 4a and 4b are schematic views respectively explaining one embodiment of the known information display panel.

FIGS. 6a and 6b are schematic views respectively explaining one embodiment of the information display panel according to the second aspect of the invention.

FIGS. 9a-9c are schematic views respectively explaining one embodiment of a rear substrate in the known information display device.

FIGS. 10a-10c are schematic views respectively explaining one embodiment of a rear substrate in the information display device according to the third aspect of the invention.

BEST MODE FOR CARRYING OUT THE INVENTION

Figure 1:
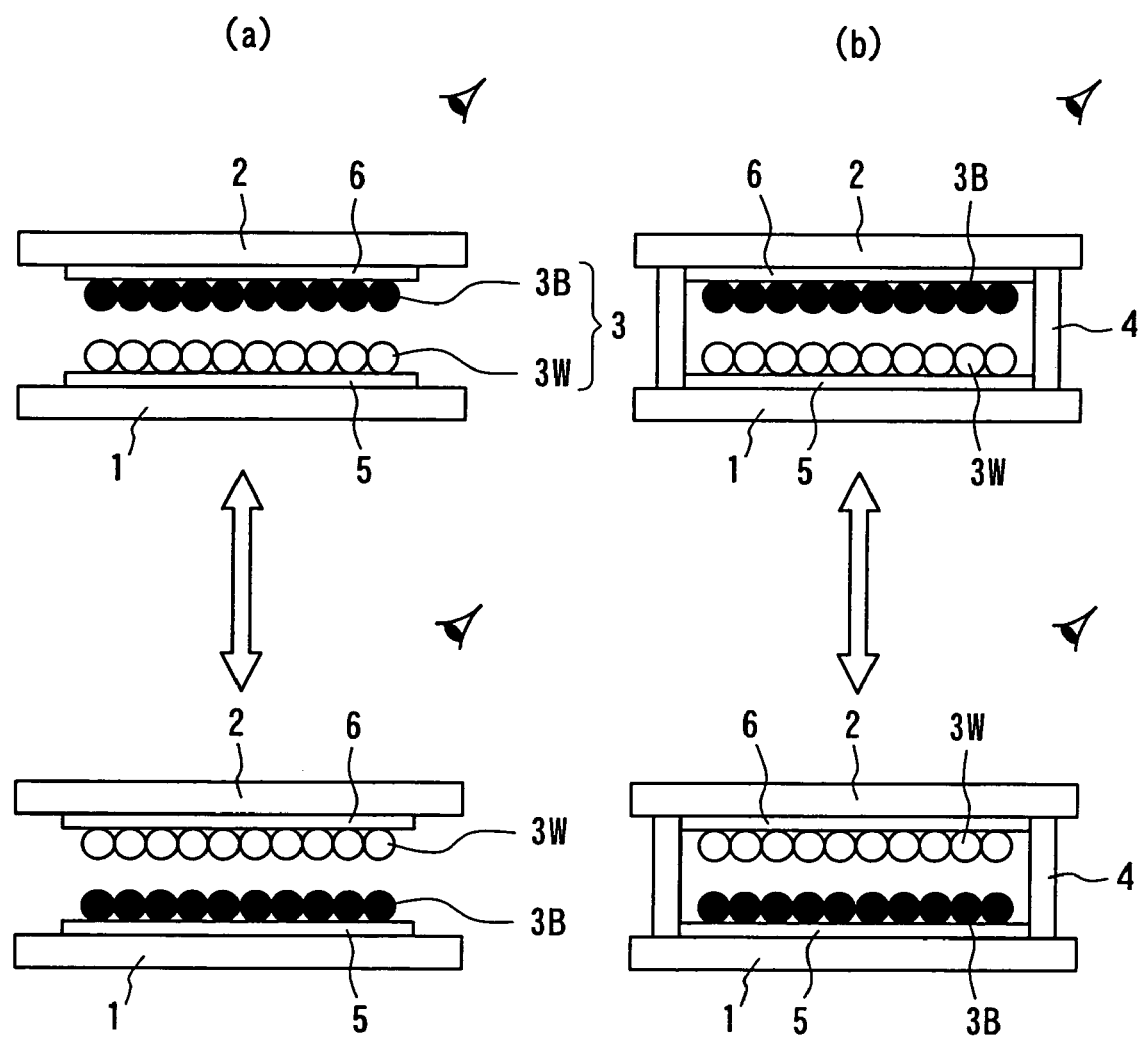
FIGS. 1a and 1b are schematic views respectively showing one construction of the information display panel used in the information display device according to the invention.

At first, a basic construction of an information display panel used for an information display device will be explained. In the information display panel used in the present invention, an electrostatic field is applied to display media sealed between opposed two substrates. Charged display media are attracted along a direction of electrostatic field to be applied by means of Coulomb's force, and thus the display media can be moved reciprocally by varying a direction of electrostatic field due to a switching operation of potential. Accordingly, an image can be displayed. Therefore, it is necessary to design the information display panel in such a manner that the display media can move evenly and maintain stability during a reciprocal operation or during a reserving state. Here, in the case of using particles or liquid powders as the display media, as to forces applied to the particles, there are an attraction force between the particles due to Coulomb' force, an imaging force with respect to the electrode panel, an intermolecular force, a liquid bonding force and a gravity.

Examples of the information display panel used in the information display device according to the invention will be explained with reference to FIGS. 1a and 1b. In the examples shown in FIGS. 1a and 1b, two or more groups of display media 3 having different colors (here, white display media 3W made of particles and black display media 3B made of particles) are moved perpendicularly with respect to substrates 1 and 2 in response to an electrostatic field generated by applying a voltage between an electrode 5 arranged on the substrate 1 and an electrode 6 arranged on the substrate 2. Then, a black color display is performed in such a manner that the black display media 3B are detected by an observer, or, a white color display is performed in such a manner that the white display media 3W are detected by an observer. In the example shown in FIG. 1b, a display cell is formed by arranging, for example, grid-like partition walls 4 between the substrates 1 and 2 in addition to the example shown in FIG. 1a. Moreover, in FIG. 1b, the partition wall arranged at a near side is omitted. The explanations mentioned above can be applied in the same manner if the white display media 3W are substituted by white display media made of liquid powders and the black display media 3B made of particles are substituted by black display media made of liquid powders.

The features of the method of manufacturing the information display device according to the invention is to a method of stacking the transparent front substrate 2 and the rear substrate 1. Particularly, in the first and second aspects of the invention, the feature lies on a connecting method between the front electrode 6 arranged on the front substrate 2 and the rear electrode 5 arranged on the substrate 1 during the stacking operation. In addition, in the second aspect of the invention, the feature lies on an arranging method of the rear electrode 5 with respect to the rear substrate 1 during the stacking operation. Hereinafter, these features will be explained in detail.

<Explanation of the First Aspect of the Invention>

Figure 2:
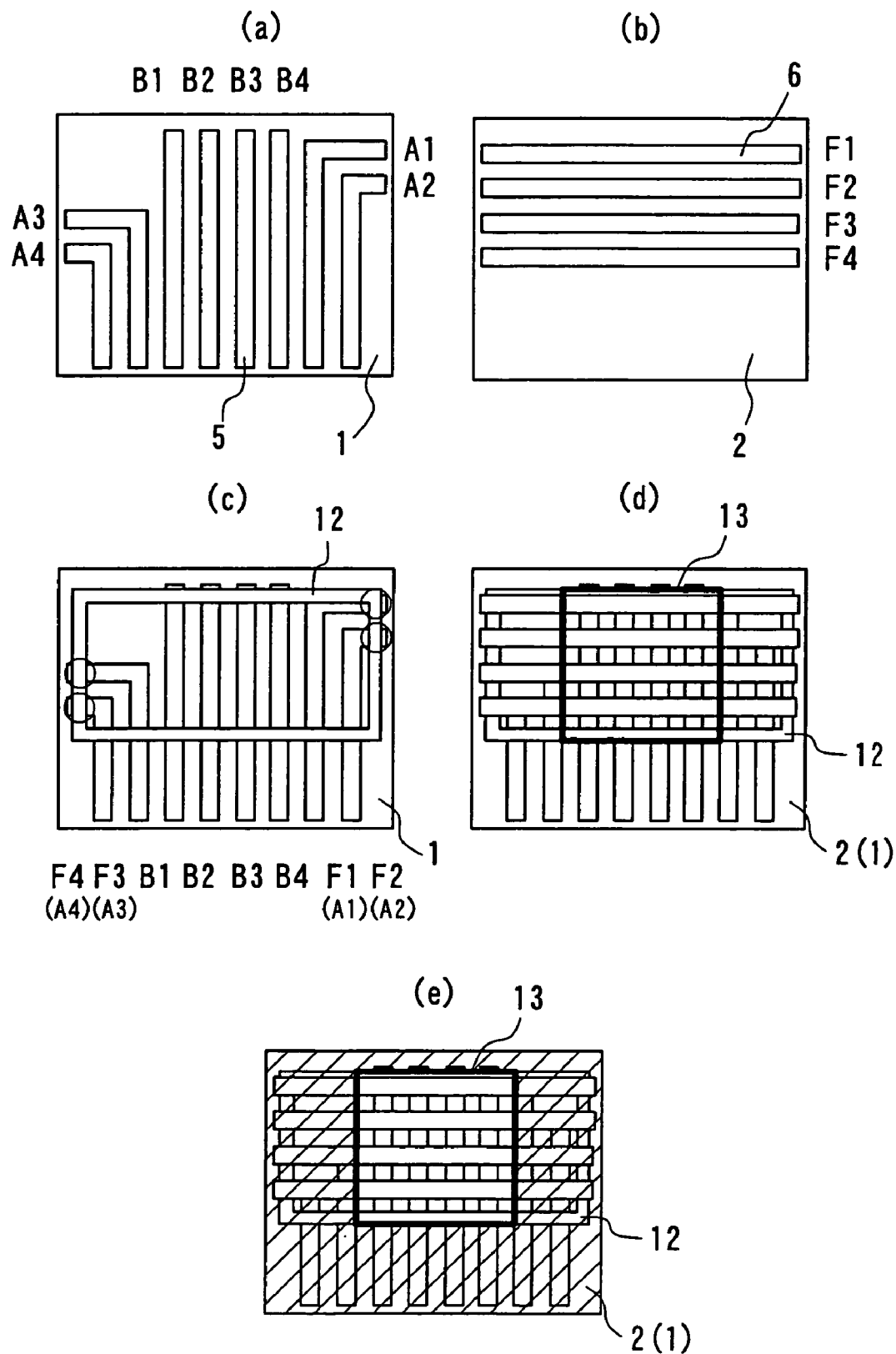
FIGS. 2a- 2e are schematic views respectively illustrating one embodiment of the method of manufacturing the information display device according to the first aspect of the invention.

FIGS. 2a-2e are schematic views respectively showing one embodiment of the method of manufacturing the information display device according to the first aspect of the invention. At first, as shown in FIG. 2a, the rear substrate 1 is prepared, on which electrodes B1-B4 for supplying power to cells forming respective information display portions and electrodes A1-A4 for connecting the connection terminals of the outer circuit are arranged. In addition, as shown in FIG. 2b, the transparent front substrate 2 is prepared, on which transparent electrodes F1-F4 for supplying power to the cells forming respective information display portions are arranged. Then, as shown in FIG. 2c, an adhesive 12 constituted for indicating anisotopic conductivity by means of some kind of means is arranged on the rear substrate 1 at an outer portion of the information display portion. The adhesive 12 having such anisotoropic conductivity has conductivity only at the portions indicated by a symbol ◯ at which the electrodes A1-A4 and the electrodes F1-F4 of the front substrate 2 are intersected. Then, as shown in FIG. 2d, the front substrate 2 is stacked on the rear substrate 1 through the adhesive 12, so that the electrodes F1-F4 of the front substrate 2 are electrically derived from the electrodes A1-A4 of the rear substrate 1. It should be noted that a numeral 13 shows the information display portion.

One feature of the method of manufacturing the information display device according to the first aspect of the invention is that, as the adhesive 12 having anisotropic conductivity shown in FIG. 2c, use is made of the adhesive including conductive spacer particles having a diameter smaller than a distance between the electrodes A1-A4, B1-B4 arranged on the rear substrate 1 and the electrodes F1-F4 arranged on the front substrate 2, and both electrodes are electrically connected by contacting them via the conductive spacer particles. Another feature is that, as shown in FIG. 2e, the substrate (indicated by a hatched area), to which the adhesive 12 is arranged, is pressed under pressure so as to connect the electrodes F1-F4 arranged on the front substrate 2 and the electrodes A1-A4 arranged on the rear substrate 1.

In the information display panel according to the first aspect of the invention, which is manufactured in the manner mentioned above, as shown in FIGS. 3a and 3b, since the front substrate 2 made of for example resin and having flexibility is deformed by the pressing operation, and the electrodes F1-F4 and the electrodes A1-A4 are connected, it is possible to use the conductive spacer particles 14 having a diameter smaller than the distance between the adjacent electrodes. Therefore, as shown in FIG. 3b, the conductive spacer particles 14 do not bridge the adjacent electrodes and do not short the adjacent electrodes, and thus it is possible to perform the connection having electrically and mechanically excellent reliability. On the other hand, even in the case of using the conductive spacer particles 14, if the conductive spacer particles 14 having a larger diameter are used, it is not possible to perform the pressing operation and generate a short circuit between the electrodes as shown in FIGS. 4a and 4b, and thus the information display is not performed. As a diameter of the conductive spacer particles 14, it is sufficient to be smaller than the distance between the electrodes. Normally, it is preferred that a diameter of the conductive spacer particles 14 is 5-50 µm, but a preferred diameter is varied according to the design of the information display device.

<Explanation of the Second Aspect of the Invention>

Figure 5:
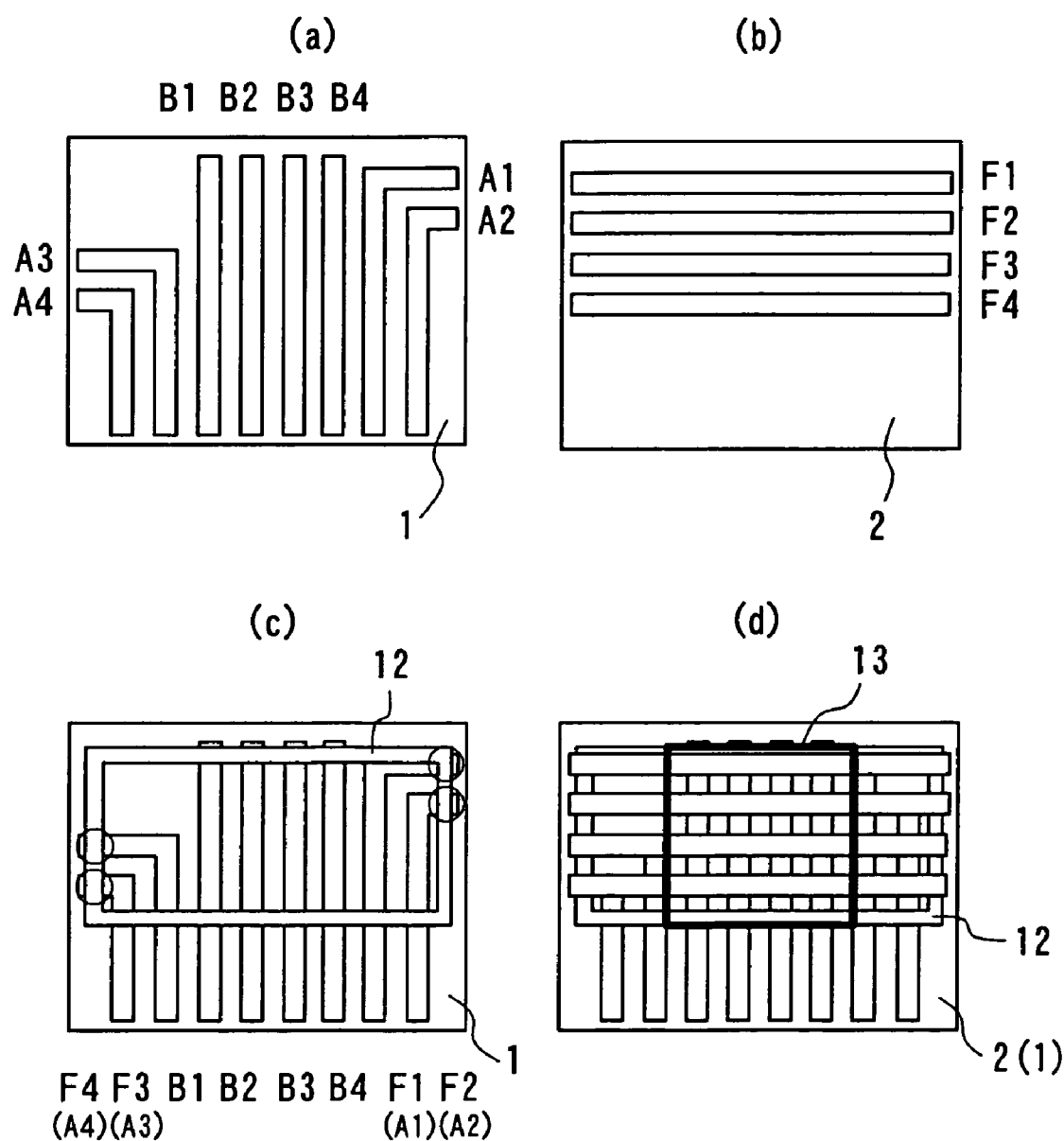
FIGS. 5a-5d are schematic views respectively showing one embodiment of the method of manufacturing the information display device according to the second aspect of the invention.

FIGS. 5a-5d are schematic views respectively showing one embodiment of the method of manufacturing the information display device according to the second aspect of the invention. At first, as shown in FIG. 5a, the rear substrate 1 is prepared, on which electrodes B1-B4 for supplying power to cells forming respective information display portions and electrodes A1-A4 for connecting the connection terminals of the outer circuit are arranged. In addition, as shown in FIG. 5b, the transparent front substrate 2 is prepared, on which transparent electrodes F1-F4 for supplying power to the cells forming respective information display portions are arranged.

Then, as shown in FIG. 5c, an adhesive 12 constituted for indicating anisotropic conductivity by means of some kind of means is arranged on the rear substrate 1 at an outer portion of the information display portion. The adhesive 12 having such anisotropic conductivity has conductivity only at the portions indicated by a symbol ○ at which the electrodes A1-A4 and the electrodes F1-F4 of the front substrate 2 are intersected. Then, as shown in FIG. 5d, the front substrate 2 is stacked on the rear substrate 1 through the adhesive 12, so that the electrodes F1-F4 of the front substrate 2 are electrically derived from the electrodes A1-A4 of the rear substrate 1. It should be noted that a numeral 13 shows the information display portion.

One feature of the method of manufacturing the information display device according to the second aspect of the invention is that, as the adhesive 12 having anisotropic conductivity shown in FIG. 5a, use is made of the adhesive including conductive spacer particles, and the electrodes A1-A4, B1-B4 arranged on the rear substrate 1 and the electrodes F1-F4 arranged on the front substrate 2 are electrically connected by contacting them via the conductive spacer particles. Another feature is that, as shown in FIGS. 6a and 6b, a spacer 16 is arranged between the adjacent electrodes (here, a portion between the electrodes F3 and F4 on the substrate 2 and a portion between the electrodes A3 and A4 on the substrate 1), to which the adhesive 12 including the conductive spacer particles 14, and thus it is possible to perform the electric connection only between the electrodes F3 and A3 and between the electrodes F4 and A4. Since the spacer 16 is arranged, it is possible to prevent a short circuit between the adjacent electrodes, in spite of a size of the conductive spacer particles 12 (it is a matter of course that the spacer particles having a diameter larger than a space between the substrates). In this case, if the spacer 16 is formed simultaneously with a rib formation constituting the partition wall, it is possible to form the spacer 16 without adding additional processes to the known manufacturing process.

Figure 7:
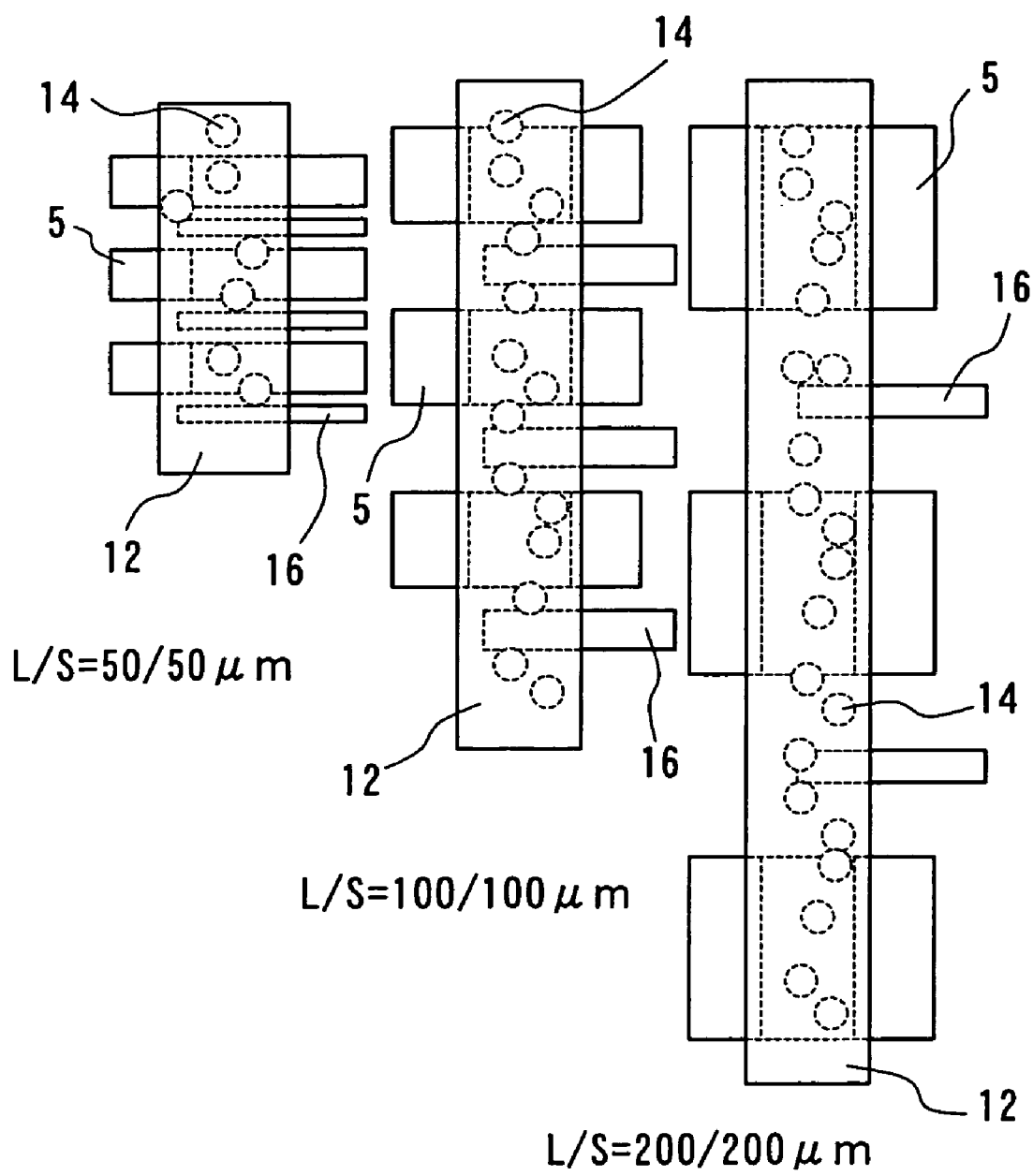
FIG. 7 is a schematic view illustrating an example used for explaining the second aspect of the invention.
Figure 8:
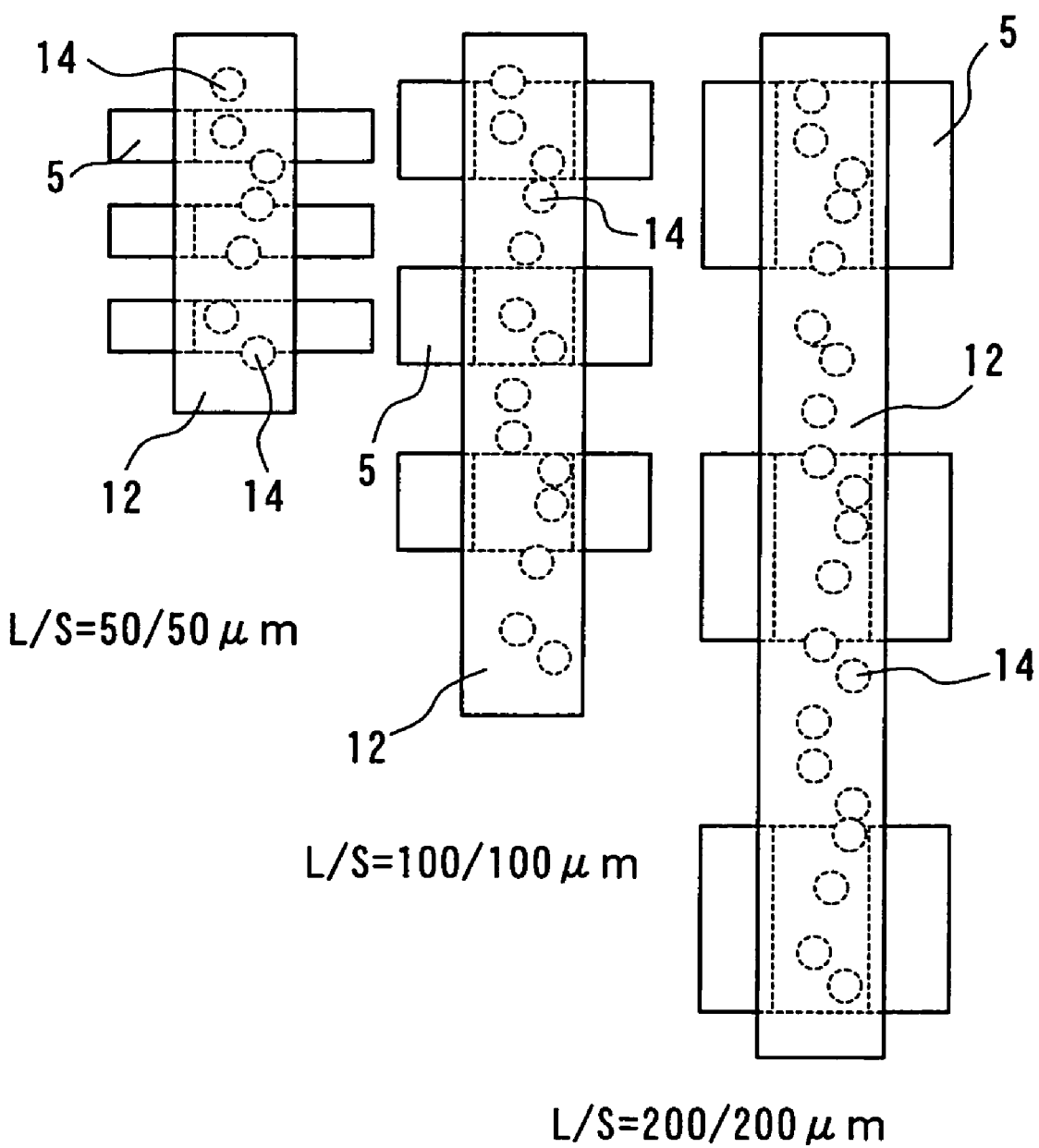
FIG. 8 is a schematic view depicting a comparative example used for explaining the second aspect of the invention.

Actually, with respect to the examples according to the invention, in which the spacer 16 is arranged between the electrodes 5 and the adhesive 12 including the conductive spacer particles 14 is arranged as shown in FIG. 7 (a relation between width L of the electrode and interval S between the electrodes is L/S=50/50, 100/100 and 200/200 (μm)), and the comparative examples, in which no spacer is arranged between the electrodes 5 and the adhesive 12 including the conductive spacer particles 14 is arranged as shown in FIG. 8 (a relation between width L of the electrode and interval S between the electrodes is L/S=50/50, 100/100 and 200/200 (μm)), a connection failure between the electrode arranged on the upper substrate and the electrode arranged on the lower substrate, and a short circuit occurrence between the adjacent electrodes are detected. The results are shown in the following Table 1. From the results shown in Table 1, it is confirmed that, in the comparative examples, a short circuit occurs if an interval between the adjacent electrodes is short, and thus the spacer 16 functions to prevent such a short circuit.

TABLE 1

| L/S | | Examples according to the invention Spacer using | Comparative examples No spacer using |
|---|---|---|---|
| 50/50 | Connection failure | Under 1 ppm | 0.01% |
| | Short circuit | Under 1 ppm | 20% |
| 100/100 | Connection failure | Under 1 ppm | 0.0001% |
| | Short circuit | Under 1 ppm | 1% |
| 200/200 | Connection failure | Under 1 ppm | Under 1 ppm |
| | Short circuit | Under 1 ppm | Under 1 ppm |

<Explanation of the Third Aspect of the Invention>

A feature of the method of manufacturing the information display device according to the third aspect of the invention is that, as compared with the known device, in which the rear electrodes 5 (corresponding to the electrodes A1-A4 and B1-B4) are arranged only on one surface of the rear substrate 1 as shown in FIGS. 9a-9c, rear electrode 5-1 are arranged on a front surface of the rear substrate 1 as is the same as the known device, rear electrodes 5-2 are further arranged on a rear surface of the rear substrate 1, and the rear electrodes 5-1 and the rear electrodes 5-2 are electrically connected via through holes 5-3 (a conductive material is arranged therein) as shown in FIGS. 10a-10c. Therefore, it is possible to use the rear electrodes 5-2 arranged on the rear surface of the rear substrate 1 for the purpose of the connection with the connection terminals of the outer circuit.

Figure 11:
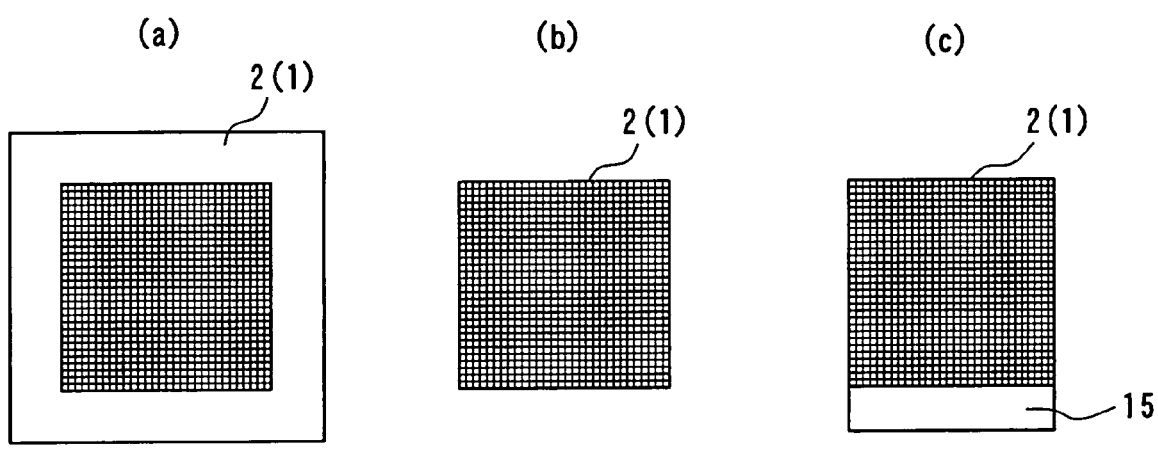
FIGS. 11a-11c igmentsare schematic views respectively explaining one embodiment of the method of manufacturing the information display device according to the third aspect of the invention.
Figure 15:
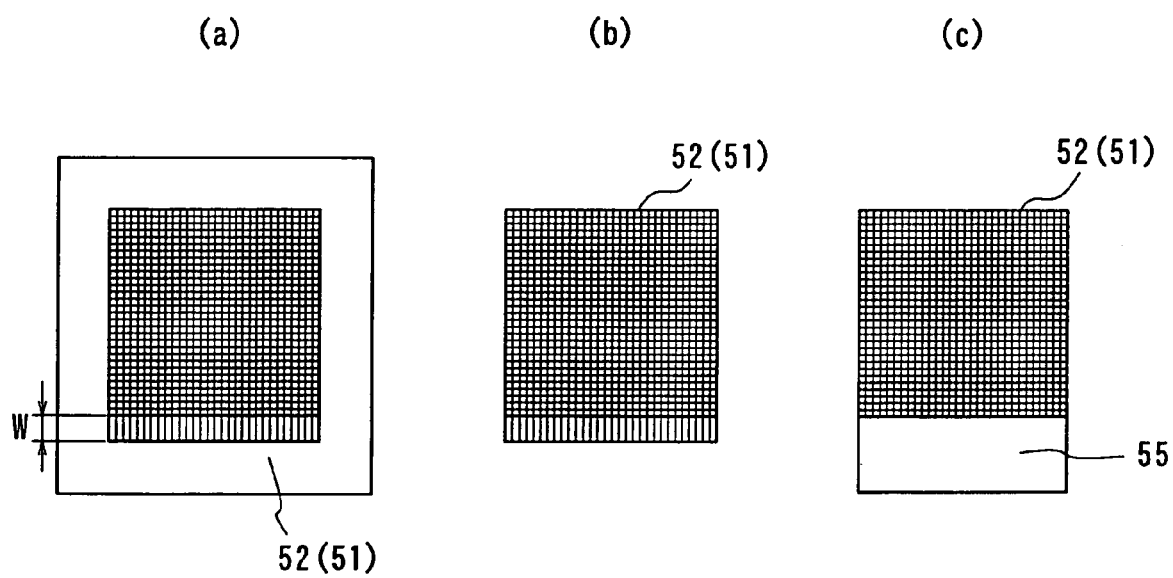
FIGS. 15a-15c are schematic views respectively explaining problems in the method of manufacturing the known information display device.

If the information display device is manufactured in the manner mentioned above, it is not necessary to use the W portion of the electrodes A1-A4 and B1-B4, which is exposed for the connection with the connection terminals of the outer circuit when the front substrate and the rear substrate are stacked as explained in the known device shown in FIG. 15a, and thus it is possible to stack the front substrate 2 and the rear substrate 1 as shown in FIG. 11a. As a result, as shown in FIG. 11b, the cutting operation can be achieved only by cutting all sides of the substrate. In addition, as shown in FIG. 11c, the information display device can be obtained only by connecting the connection terminals of the outer circuit 15 with respect to the rear electrodes 5-2, which exist on the rear surface of the rear substrate 1. Therefore, easy machining and narrow non-displaying area can be realized.

Hereinafter, respective members of the information display device according to the invention will be explained in detail.

As the substrate, at least one of the substrates is the transparent substrate 2 through which a color of the particles can be observed from outside of the device, and it is preferred to use a material having a high transmission factor of visible light and an excellent heat resistance. The substrate 1 may be transparent or may be opaque. Examples of the substrate material include polymer sheets such as polyethylene terephthalate, polyether sulfone, polyethylene, polycarbonate, polyimide or acryl and metal sheets having flexibility and inorganic sheets such as glass, quartz or so having no flexibility (it is possible to use them for the substrate material at which it is not necessary to bend for the electrode connection). The thickness of the substrate at which it is necessary to bend for the electrode connection, is preferably 2 to 400 μm, more preferably 5 to 300 μm. When the thickness is too thin, it becomes difficult to maintain strength and distance uniformity between the substrates, and when the thickness is thicker than 400 μm, there is a drawback on the electrode connection since the bending strength becomes strong.

As the electrodes 5 and 6, the electrode 6 arranged to a side of the substrate 2, in which transparency is necessary since it is an observation side, is formed of electro-conductive materials, which are transparent and having pattern formation capability. As such electro-conductive materials, indium oxide, metals such as aluminum, gold, silver, copper and so on, or, transparent conductive metal oxides such as ITO, conductive tin oxide, conductive zinc oxide and so on, or, conductive polymer such as polyaniline, polypyrrole and polythiophene formed by vacuum vapor deposition method, coating method, and so on. Additionally, the thickness of the electrode may be suitable unless the electro-conductivity is absent or any hindrance exists in optical transparency, and it is preferable to be 3 to 1000 nm, more preferable to be 5 to 400 nm. The material and the thickness of the electrode 5 arranged to a side of the substrate 1 are the same as those of the electrode 6, but transparency is not necessary. In this case, the applied outer voltage may be superimposed with a direct current or an alternate current.

As the partition wall 4, a shape of the partition wall is suitably designed in accordance with a kind of the display media used for the display and is not restricted. However, it is preferred to set a width of the partition wall to 1-100 µm more preferably 1-50 µm and to set a height of the partition wall to 10-500 µm more preferably 10-200 µm. Moreover, as a method of forming the partition wall, use may be made of a double rib method wherein ribs are formed on the opposed substrates respectively and they are connected with each other and a single rib method wherein a rib is formed on one of the opposed substrates only. The present invention may be preferably applied to both methods mentioned above.

Figure 12:
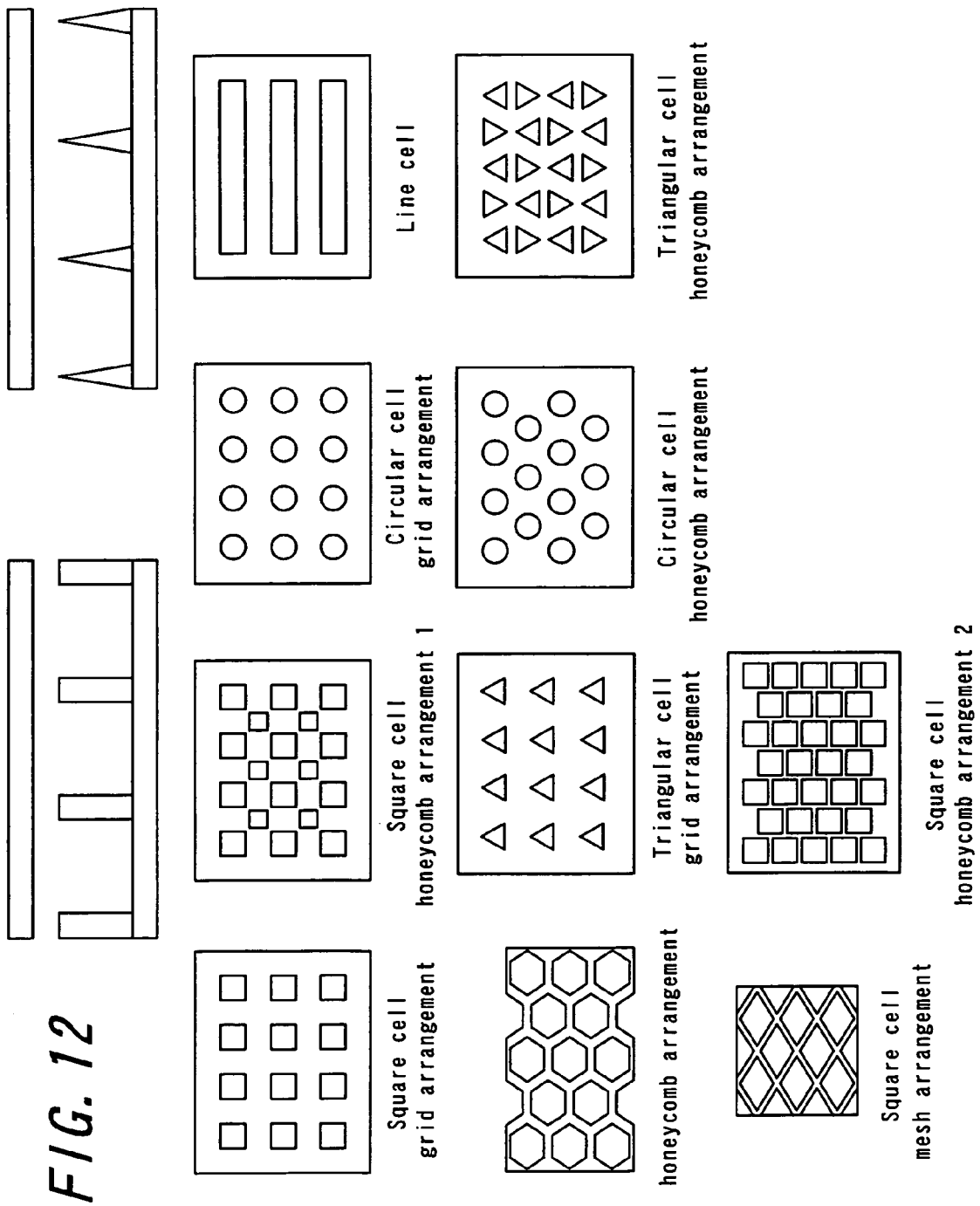
FIG. 12 is a schematic view showing one embodiment of a shape of the partition walls in the information display panel used in the information display device according to the invention.

The cell formed by the partition walls each made of rib has a square shape, a triangular shape, a line shape, a circular shape and a hexagon shape, and has an arrangement such as a grid, a honeycomb and a mesh, as shown in FIG. 12 viewed from a plane surface of the substrate. It is preferred that the portion corresponding to a cross section of the partition wall observed from the display side (an area of the frame portion of the display cell) should be made as small as possible. In this case, a clearness of the image display can be improved. The formation method of the partition wall is not particularly restricted, however, a screen-printing method, a die transferring method, a sandblast method, a photolithography method and an additive method. Among them, it is preferred to use a photolithography method using a resist film and a die transferring method.

Then, particles for the display media (hereinafter, sometimes called as particles) constituting the display media used for displaying in the information display panel will be explained. The particles for the display media are used as the display media constructed only by the particles for the display media, or, the display media constructed by combining with the other particles, or, the display media constructed and controlled to be the liquid powders (mentioned below).

As the particles for the display media used in the present invention, although any of colored particles negatively or positively chargeable having capability of moving by electrostatic force or Coulomb's force are employable, spherical particles with light specific gravity are particularly preferable. The particles have a single color, and white or black particles are preferably used. The average particle diameter is preferable to be 0.1 to 50 µm, particularly to be 1 to 30 µm. When the particle diameter is less than this range, charge density of the particles will be so large that an imaging force to an electrode and a substrate becomes too strong; resulting in poor following ability at the inversion of its electric field, although the memory characteristic is favorable. On the contrary, when the particle diameter exceeds the range, the following ability is favorable, however, the memory characteristic will degrade.

If the particles satisfy electrostatic property and so on, the particles may be formed by any materials. For example, it is formed by resin, charge control agent, coloring agent, inorganic additive and so on, or, by coloring agent and so on only.

Typical examples of the resin include urethane resin, urea resin, acrylic resin, polyester resin, acryl urethane resin, acryl urethane silicone resin, acryl urethane fluorocarbon polymers, acryl fluorocarbon polymers, silicone resin, acryl silicone resin, epoxy resin, polystyrene resin, styrene acrylic resin, polyolefin resin, butyral resin, vinylidene chloride resin, melamine resin, phenolic resin, fluorocarbon polymers, polycarbonate resin, polysulfon resin, polyether resin, and polyamide resin. Two kinds or more of these may be mixed and used. For the purpose of controlling the attaching force with the substrate, acryl urethane resin, acryl silicone resin, acryl fluorocarbon polymers, acryl urethane silicone resin, acryl urethane fluorocarbon polymers, fluorocarbon polymers, silicone resin are particularly preferable.

Examples of the electric charge control agent include, but not particularly specified to, negative charge control agent such as salicylic acid metal complex, metal containing azo dye, oil-soluble dye of metal-containing (containing a metal ion or a metal atom), the fourth grade ammonium salt-based compound, calixarene compound, boron-containing compound (benzyl acid boron complex), and nitroimidazole derivative. Examples of the positive charge control agent include nigrosine dye, triphenylmethane compound, the fourth grade ammonium salt compound, polyamine resin, imidazole derivatives, etc. Additionally, metal oxides such as ultra-fine particles of silica, ultra-fine particles of titanium oxide, ultra-fine particles of alumina, and so on; nitrogen-containing circular compound such as pyridine, and so on, and these derivates or salts; and resins containing various organic pigments, fluorine, chlorine, nitrogen, etc. can be employed as the electric charge control agent.

As for a coloring agent, various kinds of organic or inorganic pigments or dye as will be described below are employable.

Examples of black pigments include carbon black, copper oxide, manganese dioxide, aniline black, and activate carbon. Examples of yellow pigments include chrome yellow, zinc chromate, cadmium yellow, yellow iron oxide, mineral first yellow, nickel titanium yellow, navel orange yellow, naphthol yellow S, hanzayellow G, hanzayellow 10G, benzidine yellow G, benzidine yellow GR, quinoline yellow lake, permanent yellow NCG, and tartrazinelake. Examples of orange pigments include red chrome yellow, molybdenum orange, permanent orange GTR, pyrazolone orange, Balkan orange, Indanthrene brilliant orange RK, benzidine orange G, and Indanthrene brilliant orange GK. Examples of red pigments include red oxide, cadmium red, diachylon, mercury sulfide, cadmium, permanent red 4R, lithol red, pyrazolone red, watching red, calcium salt, lake red D, brilliant carmine 6B, eosin lake, rhodamine lake B, alizarin lake, and brilliant carmine 3B.

Examples of purple pigments include manganese purple, first violet B, and methyl violet lake. Examples of blue pigments include Berlin blue, cobalt blue, alkali blue lake, Victoria blue lake, phthalocyanine blue, metal-free phthalocyanine blue, partially chlorinated phthalocyanine blue, first sky blue, and Indanthrene blue BC. Examples of green pigments include chrome green, chromium oxide, pigment green B, Malachite green lake, and final yellow green G. Further, examples of white pigments include zinc white, titanium oxide, antimony white, and zinc sulphide.

Examples of extenders include baryta powder, barium carbonate, clay, silica, white carbon, talc, and alumina white. Furthermore, there are Nigrosine, Methylene Blue, rose bengal, quinoline yellow, and ultramarine blue as various dyes such as basic dye, acidic dye, dispersion dye, direct dye, etc. These coloring agents may be used alone or in combination of two or more kinds thereof. Particularly, carbon black is preferable as the black coloring agent, and titanium oxide is preferable as the white coloring agent.

Although the manufacturing method of the particles is not specifically restricted, mixing/grinding method or polymerization method for producing toner of electrophotography is, for example, similarly employable. Further the method of coating resin or charge control agent and so on over the surface of powders such as inorganic or organic pigments is also employable.

Moreover, as the average particle size d(0.5) of the particles to used, it is preferred to set d(0.5) to 0.1-50 μm and to use even particles. If the average particle size d(0.5) exceeds this range, the image clearness sometimes deteriorated, and, if the average particle size is smaller than this range, an agglutination force between the particles becomes larger and the movement of the particles is prevented.

Further, it is preferred that particle size distribution Span of the particles, which is defined by the following formula, is not more than 5 preferably not more than 3:

$$\text{Span}=(d(0.9)-d(0.1))/d(0.5)$$

(here, d(0.5) means a value of the particle size expressed by μm wherein an amount of the particles having the particle size larger than or smaller than this value is 50%, d(0.1) means a value of the particle size expressed by μm wherein an amount of the particles having the particle size smaller than this value is 10%, and d(0.9) means a value of the particle size expressed by μm wherein an amount of the particles having the particle size smaller than this value is 90%).

If the particle size distribution Span of the particles is set to not more than 5, the particle size becomes even and it is possible to perform an even particle movement.

Furthermore, as a correlation between the particles, it is preferred to set a ratio of d(0.5) of the particles having smallest diameter with respect to d(0.5) of the particles having largest diameter to not more than 50 preferably not more than 10.

Here, the particle diameter distribution and the particle diameter mentioned above can be measured by means of a laser diffraction/scattering method. When a laser light is incident upon the particles to be measured, a light intensity distribution pattern due to a diffraction/scattering light occurs spatially. This light intensity distribution pattern corresponds to the particle diameter, and thus it is possible to measure the particle diameter and the particle diameter distribution.

In the present invention, it is defined that the particle diameter and the particle diameter distribution are obtained by a volume standard distribution. Specifically, the particle diameter and the particle diameter distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

Here, in order to further improve a repeating durability, it is effective to control a water absorbing rate and a solvent insoluble rate of the resin constituting the particles.

It is preferred that the water absorbing rate of the resin constituting the particles is not more than 3 wt % especially not more than 2 wt %. In this case, a measurement of the water absorbing rate is performed according to ASTM-D570 and a measuring condition is 23° C. for 24 hours.

As for the solvent insoluble rate of the particles, it is preferred that a solvent insoluble rate of the particles, which is defined by the following formula, is not less than 50% more preferably not less than 70%:

$$\text{solvent insoluble rate (\%)}=(B/A)\times 100;$$

(here, A is a weight of the resin component before being immersed into the solvent and B is a weight of resin components after the particles are immersed into good solvent at 25° C. for 24 hours).

If the solvent insoluble rate is less than 50%, a bleed is generated on a surface of the particle material constituting the particles when maintaining for a long time. In this case, it affects an adhesion power with the particles and prevents a movement of the particles. Therefore, there is a case such that it affects a durability of the image display.

Here, as a solvent (good solvent) for measuring the solvent insoluble rate, it is preferred to use fluoroplastic such as methyl ethyl ketone and so on, polyamide resin such as methanol and so on, acrylic urethane resin such as methyl ethyl ketone, toluene and so on, melamine resin such as acetone, isopropanol and so on, silicone resin such as toluene and so on.

Then, the liquid powders used as the display media for the displaying in the information display device will be explained. As a name of the liquid powders utilized in the information display apparatus according to the invention, the applicant has the right of "electric liquid powders (trade mark)".

In the present invention, a term "liquid powders" means an intermediate material having both of liquid properties and particle properties and exhibiting a self-fluidity without utilizing gas force and liquid force. Preferably, it is a material having an excellent fluidity such that there is no repose angle defining a fluidity of powder. For example, a liquid crystal is defined as an intermediate phase between a liquid and a solid, and has a fluidity showing a liquid characteristic and an anisotropy (optical property) showing a solid characteristic (Heibonsha Ltd.: encyclopedia). On the other hand, a definition of the particle is a material having a finite mass if it is vanishingly small and receives an attraction of gravity (Maruzen Co., Ltd.: physics subject-book). Here, even in the particles, there are special states such as gas-solid fluidized body and liquid-solid fluidized body. If a gas is flown from a bottom plate to the particles, an upper force is acted with respect to the particles in response to a gas speed. In this case, the gas-solid fluidized body means a state that is easily fluidized when the upper force is balanced with the gravity. In the same manner, the liquid-solid fluidized body means a state that is fluidized by a liquid. (Heibonsha Ltd.: encyclopedia) In the present invention, it is found that the intermediate material having both of fluid properties and solid properties and exhibiting a self-fluidity without utilizing gas force and liquid force can be produced specifically, and this is defined as the liquid powders.

That is, as is the same as the definition of the liquid crystal (intermediate phase between a liquid and a solid), the liquid powders according to the invention are a material showing the intermediate state having both of liquid properties and particle properties, which is extremely difficult to receive an influence of the gravity showing the particle properties mentioned above and indicates a high fluidity. Such a material can be obtained in an aerosol state i.e. in a dispersion system wherein a solid-like or a liquid-like material is floating in a relatively stable manner as a dispersant in a gas, and thus, in the information display device according to the invention, a solid material is used as a dispersant.

The information display panel which is a target of the present invention has a construction such that the liquid powders composed of a solid material stably floating as a dispersoid in a gas and exhibiting a high fluidity in an aerosol state are sealed between opposed two substrates, wherein one of two substrates is transparent. Such liquid powders can be made to move easily and stably by means of Coulomb's force and so on generated by applying a low voltage.

As mentioned above, the liquid powders means an intermediate material having both of liquid properties and particle properties and exhibiting a self-fluidity without utilizing gas force and liquid force. Such liquid powders become particularly an aerosol state. In the information display device according to the invention, the liquid powders used in a state such that a solid material is relatively and stably floating as a dispersoid in a gas.

As the aerosol state, it is preferred that an apparent volume in a maximum floating state is two times or more than that in none floating state, more preferably 2.5 times or more than that in none floating state, and most preferably three times or more than that in none floating state. In this case, an upper limit is not defined, but it is preferred that an apparent volume is 12 times or smaller than that in none floating state.

If the apparent volume in the maximum floating state is smaller than two times, a display controlling becomes difficult. On the other hand, if the apparent volume in the maximum floating state is larger than 12 times, a handling inconvenience during a liquid powders filling operation into the device such as a particle over-scattering occurs. That is, it is measured by filling the liquid powders in a transparent closed vessel through which the liquid powders are seen; vibrating or dropping the vessel itself to obtain a maximum floating state; and measuring an apparent volume at that time from outside of the vessel. Specifically, the liquid powders having a volume 1/5 of the vessel are filled as the liquid powders in a vessel with a polypropylene cap having a diameter (inner diameter) of 6 cm and a height of 10 cm (product name I-boy produced by As-one Co., Ltd.), the vessel is set in the vibrator, and a vibration wherein a distance of 6 cm is repeated at a speed of 3 reciprocating/sec. is performed for 3 hours. Then, the apparent volume in the maximum floating state is obtained from an apparent volume just after a vibration stop.

Moreover, in the information display panel according to the invention, it is preferred that a time change of the apparent volume of the liquid powders satisfies the following formula:

$$V_{10}/V_5 > 0.8;$$

here, $V_5$ indicates the apparent volume (cm$^3$) of the liquid powders after 5 minutes from the maximum floating state; and $V_{10}$ indicates the apparent volume (cm$^3$) of the liquid powders after 10 minutes from the maximum floating state. In this case, in the information display panel according to the invention, it is preferred to set the time change $V_{10}/V_5$ of the apparent volume of the liquid powders to larger than 0.85, more preferably larger than 0.9, most preferably larger than 0.95. If the time change $V_{10}/V_5$ is not larger than 0.8, the liquid powders are substantially equal to normal particles, and thus it is not possible to maintain a high speed response and durability according to the invention.

Moreover, it is preferred that the average particle diameter d(0.5) of the particle materials constituting the liquid powders is 0.1-20 μm, more preferably 0.5-15 μm, most preferably 0.9-8 μm. If the average particle diameter d(0.5) is less than 0.1 μm, a display controlling becomes difficult. On the other hand, if the average particle diameter d(0.5) is larger than 20 μm, a display is possible, but opacifying power is decreased and thus a thin shape device is difficult. Here, the average particle diameter d(0.5) of the particle materials constituting the liquid powders is equal to d(0.5) in the following particle diameter distribution Span.

It is preferred that particle diameter distribution Span of the particle material constituting the liquid powders, which is defined by the following formula, is not more than 5 preferably not more than 3:

$$\text{Particle diameter distribution: Span} = (d(0.9) - d(0.1))/d(0.5)$$

here, d(0.5) means a value of the particle diameter expressed by μm wherein an amount of the particle material constituting the liquid powders having the particle diameter larger than this value is 50% and an amount of the particle material constituting the liquid powders having the particle diameter expressed by μm wherein an amount of the particle material constituting the liquid powders having a particle diameter smaller than this value is 10%, and d(0.9) means a value of the particle diameter expressed by μm wherein an amount of the particle material constituting the liquid powders having the particle diameter smaller than this value is 90%. If the particle diameter distribution Span of the particle materials constituting the liquid powders is set to not more than 5, the particle diameter becomes even and it is possible to perform an even liquid powders movement.

Here, the particle diameter distribution and the particle diameter mentioned above can be measured by means of a laser diffraction/scattering method. When a laser light is incident upon the particles to be measured, a light intensity distribution pattern due to a diffraction/scattering light occurs spatially. This light intensity distribution pattern corresponds to the particle diameter, and thus it is possible to measure the particle diameter and the particle diameter distribution. In the present invention, it is defined that the particle diameter and the particle diameter distribution are obtained by a volume standard distribution. Specifically, the particle diameter and the particle diameter distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

The liquid powders may be formed by mixing necessary resin, charge control agent, coloring agent, additive and so on and grinding them, or, by polymerizing from monomer, or, by coating a particle with resin, charge control agent, coloring agent, and additive and so on. Hereinafter, typical examples of resin, charge control agent, coloring agent, additive and so on constituting the liquid powders will be explained.

Typical examples of the resin include urethane resin, acrylic resin, polyester resin, acryl urethane resin, silicone resin, nylon resin, epoxy resin, styrene resin, butyral resin, vinylidene chloride resin, melamine resin, phenolic resin, fluorocarbon polymers, and it is possible to combine two or more resins. For the purpose of controlling the attaching force with the substrate, acryl urethane resin, acryl urethane silicone resin, acryl urethane fluorocarbon polymers, urethane resin, fluorocarbon polymers are preferred.

Examples of the electric charge control agent include, positive charge control agent including the fourth grade ammonium salt compound, nigrosine dye, triphenylmethane compound, imidazole derivatives, and so on, and negative charge control agent such as metal containing azo dye, salicylic acid metal complex, nitroimidazole derivative and so on.

As for a coloring agent, various kinds of organic or inorganic pigments or dye are employable. For example, use is made of Nigrosine, Methylene Blue, quinoline yellow, rose Bengal and so on.

Examples of inorganic additives include titanium oxide, zinc white, zinc sulphide, antimony oxide, calcium carbonate, pearl white, talc, silica, calcium silicate, alumina white, cadmium yellow, cadmium red, titanium yellow, Pressian blue, Armenian blue, cobalt blue, cobalt green, cobalt violet, ion oxide, carbon black, manganese ferrite black, cobalt ferrite black, copper powder, aluminum powder.

However, if the above materials are only mixed or coated with no contrivance, the liquid powders exhibiting an aerosol state cannot be obtained. The regular method of forming the liquid powders exhibiting an aerosol state is not defined, but the following method is preferably used.

At first, inorganic fine particles having an average particle size of 20-100 nm preferably 20-80 nm are preferably fixed on a surface of materials constituting the liquid powders. Moreover, it is preferred that the inorganic fine particles are made of tow or more groups of fine particles. Further, it is preferred to treat the inorganic fine particles by silicone oil. Here, as for the inorganic fine particles, use may be made of silicon dioxide (silica), zinc oxide, aluminum oxide, magnesium oxide, cerium oxide, ferric oxide, copper oxide and so on. In this case, a method of fixing the inorganic fine particles is important. For example, use may be made of hybridizer (NARA Machinery Industry Co., Ltd.) or mechano-fusion (Hosokawa Micron Co., Ltd.), and the liquid powders showing an aerosol state are formed under a predetermined condition (for example processing time).

Here, in order to further improve a repeating durability, it is effective to control a stability of the resin constituting the liquid powders, especially, a water absorbing rate and a solvent insoluble rate. It is preferred that the water absorbing rate of the resin constituting the liquid powders sealed between the substrates is not more than 3 wt % especially not more than 2 wt %. In this case, a measurement of the water absorbing rate is performed according to ASTM-D570 and a measuring condition is 23° C. for 24 hours. As for the solvent insoluble rate of the liquid powders, it is preferred that a solvent insoluble rate of the liquid powders, which is defined by the following formula, is not less than 50% more preferably not less than 70%:

$$\text{solvent insoluble rate (\%)} = (B/A) \times 100;$$

(here, A is a weight of the liquid powders before being immersed into the solvent and B is a weight of resin components after the liquid powders are immersed into good solvent at 25° C. for 24 hours).

If the solvent insoluble rate is less than 50%, a bleed is generated on a surface of the particle materials constituting the liquid powders when maintaining for a long time. In this case, it affects an adhesion power with the liquid powders and prevents a movement of the liquid powders. Therefore, there is a case such that it affects a durability of the image display. Here, as a solvent (good solvent) for measuring the solvent insoluble rate, it is preferred to use fluoroplastic such as methyl ethyl ketone and so on, polyamide resin such as methanol and so on, acrylic urethane resin such as methyl ethyl ketone, toluene and so on, melamine resin such as acetone, isopropanol and so on, silicone resin such as toluene and so on.

The particles for the display media constituting the display media according to the invention have charge characteristics. Because it is necessary for the particles to hold the charged electric charge, the particles with the volume specific resistance of $1 \times 10^{10}$ Ω·cm or greater are preferable, and the particles with slow charge attenuation property evaluated by the measuring method below are more preferable.

That is, the particles for the display media are disposed with a distance of 1 mm to a Corona discharger, and the voltage of 8 kV is applied to a Corona discharger so as to generate Corona discharge, which charges the surface. Then, the change of the surface potential is measured to determine the suitability. In this occasion, it is preferable to select the material whose maximum surface potential will be greater than 300 V after 0.3 seconds, more preferable to select the material whose maximum surface potential will be greater than 400 V after 0.3 second as the material for composing the particles. The determination mentioned above may be performed in such a manner that the particles for the display media are made into a film having a thickness of 5-100 μm by means of a press method, a heating/melting method, a casting method and so on, and a distance between the film surface and a Corona discharger is made to be 1 mm.

Figure 13:
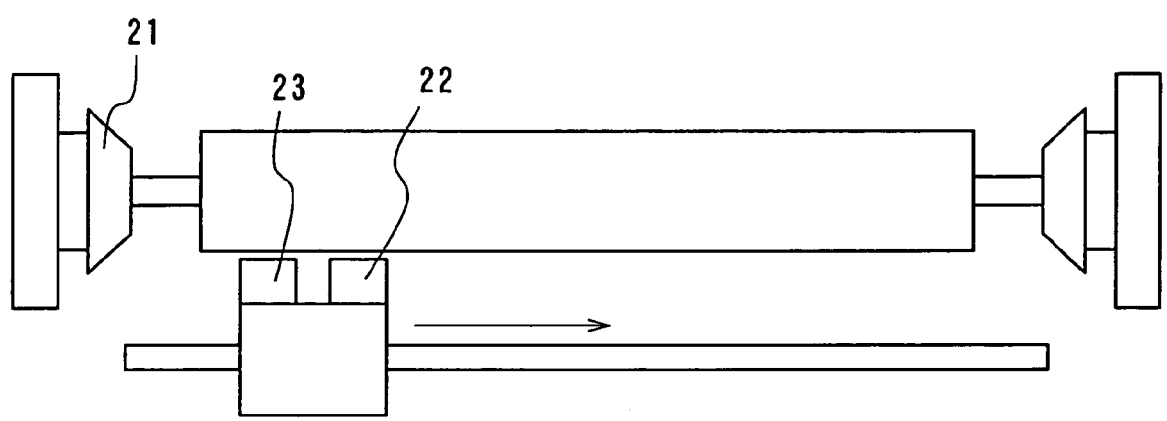
FIG. 13 is a schematic view explaining a method of measuring a volume resistivity.
Figure 14:
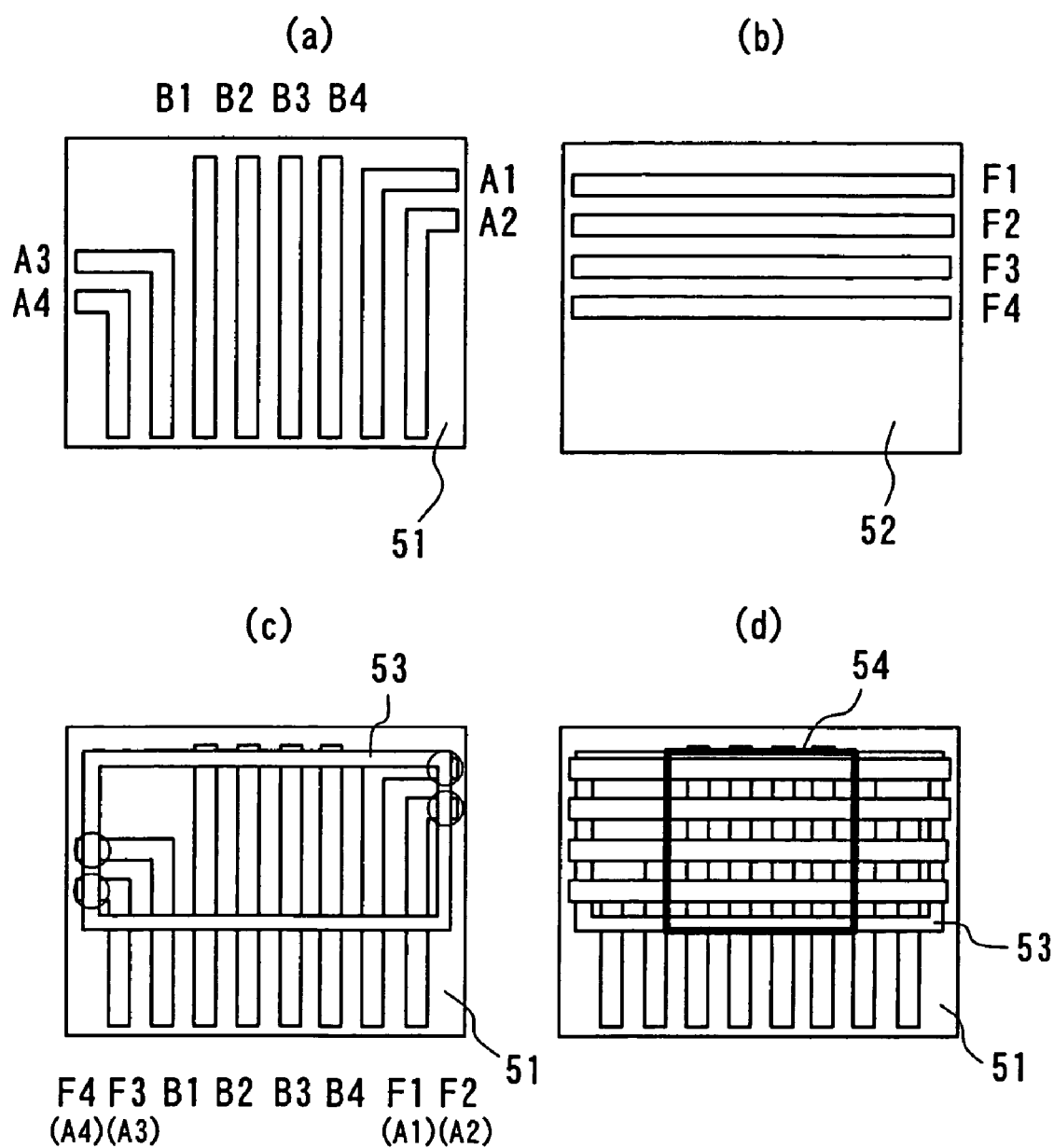
FIGS. 14a-14d are schematic views respectively illustrating one embodiment of the method of manufacturing the information display panel in the known information display device.

Additionally, the foregoing surface potential is measured by means of CRT2000 produced by QEA Inc. as shown in FIG. 13. In this instrument both end portions of a roll shaft being held with chuck 21, compact scorotron discharger 22 and surface potential meter 23 are spaced with predetermined interval to form a measurement unit. Facedly deploying the measurement unit with a distance of 1 mm from the surface of the particles for the display media or the film, and by moving the measurement unit from one end portion of the roll shaft to the other end portion with an uniform speed, with the state that the roll shaft remains stopping and while giving surface charge, a method of measuring its surface potential is preferably adopted. Moreover, measurement environment should be settled at the temperature of 25±3° C. and the humidity of 55±5 RH %.

A charge amount of the display media properly depends upon the measuring condition. However, it is understood that the charge amount of the display media used for the display media in the information display panel substantially depends upon an initial charge amount, a contact with respect to the partition wall, a contact with respect to the substrate, a charge decay due to an elapsed time, and specifically a saturation value of the particles for the display media during a charge behavior is a main factor.

After various investigations of the inventors, it is fond that an adequate range of the charged values of the particles for the display media can be estimated by performing a blow-off method utilizing the same carrier particles so as to measure the charge amount of the particles for the display media.

The measuring method will be explained later in detail. By performing the blow-off method, it is possible to contact the particles for the display media and the carrier particles sufficiently and to measure the charge amount per unit weight of respective particles for the display media by measuring its saturated charge amount. Then, it is possible to calculate the surface charge density of respective particles for the display media by obtaining a particle diameter and a specific gravity of respective particles for the display media separately.

In the information display device, since a particle diameter of the particles for the display media constituting the display media (hereinafter, referred as particles) is small and an affection of gravity is too small to neglect its affection, the specific gravity is not affected to the movement of the particles. However, on the charge amount of the particles, if the particles have a same particle diameter and a same average charge amount per unit weight, the maintained charge amounts are different by two times in the case that the specific gravities of the particles are different by two times. Therefore, it is understood that it is preferred to estimate the charge characteristics of the particles used in the information display device by the surface charge density (unit: $\mu C/m^2$), which is irrelevant to the specific gravity of the particles.

In the information display panel utilizing two groups of the particles or two groups of liquid powders as the display media, if a range of the surface charge density and a difference on the surface charge density in the particles or the liquid powders are maintained in a suitable range, two groups of the particles or the two groups of the liquid powders have a sufficient charge amount by contacting with each other, and maintains a moving function by an electrostatic field.

Here, in order to make charge characteristics of the two groups of the particles or the two groups of the liquid powders, which are existent near with each other in the information display panel, sufficient, it is necessary to obtain some degree of difference on the surface charge density so as to differentiate the moving directions of the two particles or the two liquid powders, but it is not always necessary to make the difference on the surface charge density larger. In the information display device utilizing the particle movement, when a particle diameter of the particles is large, the main factor for determining a fly/move electrostatic field (voltage) of the particles is an electric imaging force. Therefore, in order to move the particles by a low electrostatic field (voltage), it is preferred to make the charge amount low. Moreover, when a particle diameter of the particles is small, the main factor for determining the fly/move electrostatic field (voltage) is a non-electric force such as an intermolecular force, a liquid bonding force and so on. Therefore, in order to move the particles by a low electrostatic field (voltage), it is preferred to make the charge amount high. However, since theses phenomena are largely depend on surface properties (material, shape) of the particles, it is not possible to define only by the particle diameter and the charge amount.

The inventors find that, in the information display panel utilizing the particles having an average particle diameter of 0.1-50 µm or the liquid powders having an average particles of 0.1-30 µm in the particle substances constituting the liquid powders, when the absolute value of the difference between the surface charge densities of two groups of particles or two groups of liquid powders, which are measured by the blow-off method using the same kind of particles, is 10-150 $\mu C/m^2$, it is possible to obtain the particles usable for the information display device in the case of 20-150 $\mu C/m^2$ on the absolute value of the difference between the surface charge densities.

In the information display panel according to the invention, an interval between the substrates is not restricted if the display media can be moved and a contrast can be maintained, and it is adjusted normally to 10-500 µm, preferably 10-200 µm.

Moreover, it is preferred to control a volume occupied rate of the display media in a space between the opposed substrates to 5-70 vol %, more preferably 5-60 vol %. If the volume occupied rate of the display media exceeds 70 vol %, the display media become difficult to move, and if it is less than 5 vol %, a sufficient contrast cannot be obtained and a clear image display is not performed.

Further, in the present invention, it is important to control a gas in a gap surrounding the display media between the substrates, and a suitable gas control contributes an improvement of display stability. Specifically, it is important to control a humidity of the gap gas to not more than 60% RH at 25° C., preferably not more than 50% RH, more preferably not more than 35% RH.

The above gap means a gas portion surrounding the display media obtained by substituting the electrodes 5, 6, an occupied portion of the display media (particles or liquid powders) 3, an occupied portion of the partition walls 4 (in the case of arranging the partition wall) and a seal portion of the device from the space between the substrate 1 and the substrate 2 for example in FIGS. 1*a* and 1*b*.

A kind of the gap gas is not limited if it has the humidity mentioned above, but it is preferred to use dry air, dry nitrogen gas, dry helium gas, dry carbon dioxide gas, dry methane gas and so on. It is necessary to seal this gas in the device so as to maintain the humidity mentioned above. For example, it is important to perform the operations of filling the liquid powders and assembling the substrate under an atmosphere having a predetermined humidity and to apply a seal member and a seal method for preventing a humidity inclusion from outside of the device.

INDUSTRIAL APPLICABILITY

The information display device having the information display panel according to the invention is applicable to the display unit for mobile equipment such as notebook personal computers, PDAs, cellular phones and so on; to the electric paper for electric book, electric newspaper and so on; to the bulletin boards such as signboards, posters, blackboards and so on; to the image display unit for electric calculator, home electric application products, auto supplies and so on; to the card display unit for point card, IC card and so on; and to the display unit for electric POP, electric advertisement, electric price tag, electric musical score, RF-ID device and so on.

The invention claimed is:

1. A method of manufacturing an information display device having an information display panel, in which display media are sealed between a first substrate and a second substrate, at least one of the first substrate and the second substrate being transparent, and, in which the display media, to which an electrostatic field is applied, are made to move so as to display information such as an image, the method comprising:

preparing the first substrate, in which electrodes are provided on both a front surface and a rear surface of the first substrate, and, in which the electrodes are electrically connected with each other via through holes;

stacking the prepared first substrate and the second substrate; and connecting connection terminals of an outer circuit directly to the electrodes provided at the rear surface of the first substrate.

2. The method of manufacturing an information display device according to claim 1, wherein the first substrate, in which the electrodes are provided on the front surface and the rear surface thereof, is a rear substrate.

3. The method of manufacturing an information display device according to claim 1, wherein the electrodes are provided on both the front surface and the rear surface of the first substrate so as to be recessed within the front surface and the rear surface, respectively.

* * * * *